United States Patent Office 3,089,751
Patented May 14, 1963

3,089,751
SELECTIVE SEPARATION OF URANIUM FROM FERRITIC STAINLESS STEELS
Richard J. Beaver, Knoxville, and Julian H. Cherubini, Oak Ridge, Tenn., assignors to the United States of America as represented by the United States Atomic Energy Commission
No Drawing. Filed Nov. 25, 1960, Ser. No. 71,844
3 Claims. (Cl. 23—14.5)

This invention relates to the selective separation of uranium from ferritic stainless steels. More particularly it relates to a method of selectively dissolving uranium from solid reactor fuel composites fabricated with ferritic stainless steels.

Because of their strength and corrosion resistance at elevated temperatures the stainless steels have been found useful for fabricating nuclear reactor fuel elements. The ferritic stainless steels, i.e., chromium-iron alloys, in particular, offer the advantages of higher thermal conductivity, low coefficient of expansion, low neutron absorption cross-section, comparatively low cost and ready availability. The present invention will enable a considerable cost savings to be effected in processing reactor fuel elements fabricated of ferritic stainless steels.

This invention is particularly directed to the selective dissolution of uranium and other fissile and fertile values contained in nuclear fuel elements fabricated of ferritic stainless steels. As used herein, the term "ferritic" refers to a non-heat hardenable stainless steel whose microstructure is almost entirely, if not entirely, ferritic; that is, it consists of a single phase steel in which all of the alloying ingredients are dissolved in the iron and the atoms comprising its microcrystalline structure are arranged in a body centered cubic space lattice.

Reprocessing of reactor fuel may be necessary for several reasons, depending upon a particular reactor design. In a going reactor, the amount of fissile material will steadily decrease and, while by appropriate reactor design techniques some compensation may be made for this decrease, the concurrent and continual formation of fission products of high neutron capture cross section will eventually limit the life of any reactor fuel charge. In addition to these factors which occur with any reactor fuel, solid fuel elements suffer from neutron irradiation effects which result in permanent structural damage as well as chemical damage, thus further limiting their useful reactor life. Since these deleterious effects occur at a time when only a small fraction of the fissile values have been burned by the fission process and since the unburned fuel is too valuable to be wasted, it must be reprocessed to render it fit for reuse.

The prevailing method used for recovering unburned fissile and fertile fuel values from solid neutron irradiated fuel elements after dissolution involves liquid-liquid solvent extraction processes in which an aqueous nitrate feed solution containing said values is selectively extracted by contact with an organic aqueous immiscible extractant. An example of a solvent extraction process for recovering the uranium values is found in U.S. Patent 2,848,300.

The formation of an aqueous nitrate solvent extraction solution from a spent reactor fuel element must, in general, meet several technical requirements. An essential requirement is that the aqueous feed must contain all of the nuclear fuel values derived from the dissolution of a particular fuel element, these values to be maintained in solution within a minimal volume. Furthermore, the resulting solution should be stable, that is, the solute metal values in solution should not precipitate on standing or on being heated.

Solid reactor fuel elements generally consist of a fuel-containing core portion and a corrosion-resistant clad which may be bonded to said core. The dissolution of such fuel elements prior to solvent extraction may be accomplished after the clad has been mechanically stripped in cases where the clad is not metallurgically or chemically bonded to the fuel-containing core. Fuel elements constructed in this manner present no particular problem insofar as forming an aqueous nitrate solution from the core portion is concerned. However, where the clad is metallurgically or chemically bonded to the core, a mechanical stripping operation is not possible without incurring intolerable loss of valuable fissile or fertile values. In such cases, resort must be had to dissolution of the entire fuel elements. For example, to effect rapid and complete dissolution of a fuel element consisting of $UO_2$ discretely dispersed in a stainless steel matrix, and provided with a stainless steel cladding, a mixture of nitric acid and hydrochloric acid (of the order of 5 molar nitric acid and 2 molar hydrochloric acid) may be used to effect rapid and complete dissolution of the entire fuel element. This method, while it does produce a stable solution, suffers from the disadvantage that large aqueous feed volumes of inert metals must be carried through the solvent extraction process. This, in turn, leads to a large radioactive waste volume requiring an expensive waste storage and handling system. In addition, the solution is highly corrosive due, in part, to the high chloride content. Removal of chloride from the aqueous feed must be accomplished prior to solvent extraction.

In an attempt to reduce the volume of high level radioactive waste solutions, some workers have suggested that the stainless steel clad may be separately dissolved in concentrated sulfuric acid, thus making the fuel core available for ready dissolution in a nitric acid solution. However, stainless steel is rather passive to sulfuric acid and even when it does react, a high probability exists for cross contamination between decladding solutions and core solutions, thus complicating still further the problem of uranium removal.

It is therefore obvious that a need exists for and it is the principal object of this invention to provide a technically simple method for effecting selective and quantitative dissolution of fissionable and fertile metal values from a neutron irradiated ferritic stainless steel-containing fuel element.

Since the economics of nuclear fuel is determined to a large extent by the cost of its recovery from spent fuel and since the cost involved in aqueous reprocessing of nuclear fuels by solvent extraction techniques is largely determined by the volume of aqueous radioactive wastes produced per unit of recovered fuel material, it is an additional object of this invention to provide a selective and economical process of effecting dissolution of stainless steel-containing nuclear fuels within a minimal volume. Other objects will be obvious from the ensuing description.

In accordance with this invention, a nuclear fuel element consisting of a core which may comprise uranium metal or a cermet of uranium dioxide dispersed in a ferritic stainless steel matrix and a cladding of ferritic stainless steel bonded to said core is heated to a temperature in the range of 850° C. to 1050° C. for a period of time sufficient to effect the metal susceptible to intergranular corrosion. The heated element is then cooled rapidly through the temperature range 850–615° C. and thence to about room temperature. The thus cooled element is then contacted with an aqueous nitrate solution to selectively and quantitatively dissolve the uranium from said core. Thereafter the resultant uranium nitrate solution is separated from the undissolved portion of said element and is suitable for service, except for minor adjustments, as a solvent extraction feed solution.

Since the method of this invention permits selective uranium dissolution, the volume of dissolvent necessary to maintain uranium in a soluble state, will be appreciably less than has heretofore been possible. The advantages produced by the attainment of maximum uranium solubility will be reflected in the reduced size of solvent extraction apparatus and extent of treatment necessary to recover the uranium from the solution. Of particular advantage and importance is the reduced volume of radioactive waste solutions which is brought about by this invention in view of the fact that the cost of handling and storing radioactive waste solutions constitutes an appreciable part of the costs of recovering the uranium from neutron irradiated fuel elements.

In practicing this invention, a ferritic stainless steel-uranium dioxide composite is heated, preferably in an inert atmosphere such as argon or helium, so that the entire composite is at a temperature in the range 850° C. to 1050° C. for at least about 15 minutes to thereby render the steel susceptible to intergranular corrosion. To recover uranium therefrom, the heated steel composite must be cooled rapidly to the temperature range 815° C. to 650° C. and thence until the steel has cooled to a temperature of from about 100° C. to room temperature. By rapid cooling is meant that the heated element should not be held in the temperature range 850° C.–615° C. composite for any length of time to allow annealing to occur. If annealing does occur, the steel must be reheated above 850° C. to induce the intergranular corrosion effect. The uranium is removed from the cooled steel composite by immersion in a refluxing aqueous nitrate nitric acid solution. We have found that in the period required to dissolve all of the uranium, less than half of the iron and only about 0.05 percent of the chromium content will be concurrently dissolved in solution. After complete dissolution of the uranium is achieved, the uranium solution can be separated from the remaining portion of the element by any of the well known solid-liquid techniques such as by decanting, filtering, or by centrifugation. The separated solution, after appropriate adjustment of acidity and addition of salting out agent, is then suitable to serve as the aqueous feed in a solvent extraction operation designed to decontaminate and purify uranium.

It should be understood that this invention is directed to those chromium-iron alloys known as ferritic stainless steels, as hereinbefore defined and where the chromium content may range from 10 to 20 percent of the total metal content.

The following examples will illustrate our invention in further detail:

Example I

A stainless steel composite consisting of a core portion containing 6.25 grams of uranium dioxide powder mechanically clad to a 5 mil thick ferritic stainless steel containing about 18% chromium, remainder iron, was heated in an air atmosphere to a temperature of about 1050° C. and maintained at temperature for about 60 minutes. The heated composite was then cooled rapidly in air to room temperature and then immersed in a refluxing aqueous solution of 7.5 molar nitric acid. At the end of about 140 hours the resulting solution was filtered from the undissolved portions of the composite and analyzed for uranium, chromium and iron. The solution was found to contain all of the uranium, about 18% of the iron and less than 0.05% of the chromium.

Example II

A second stainless steel-uranium composite of identical composition was heat treated in the same manner as in Example I except that in this case the uranium was leached with a 7.5 molar nitric acid solution which was 0.05 molar in hydrochloric acid. After 100 hours' reflux with this solution, the resulting solution was filtered and analyzed for its metal content. It was found that the solution contained 100% of the uranium, 25% iron and only 2.2% of the chromium content found in the original untreated composite. We have found that by bubbling air through a nitric acid solution containing trace amounts of hydrochloric acid up to about 0.1 molar, the period required to recover all of the uranium into solution can be reduced still further.

It will be understood that this invention is not to be limited to the details given herein, but that it may be modified within the scope of the appended claims.

Having thus described our invention, we claim:

1. In a process for the selective separation of uranium from a nuclear fuel element comprising a uranium-containing core portion and a clad of a ferritic stainless steel, the steps which comprise heating said element, in a non-carburizing atmosphere to a temperature in the range 850–1050° C., maintaining said element at temperature for a period of at least 15 minutes, rapidly cooling said heated element through the temperature range 815° C. to 650° C. to avoid annealing said steel, contacting said cooled element with an aqueous nitrate solution until substantially all of the uranium values have been selectively dissolved therein, and thereafter separating the resultant uranyl nitrate solution from the remainder of said element.

2. The process according to claim 1, in which the ferritic stainless steel contains from 10–20% chromium.

3. The process according to claim 1, in which the uranium in the heat treated ferritic stainless steel element is removed by contacting said element with a refluxing air-saturated aqueous nitrate solution.

References Cited in the file of this patent
UNITED STATES PATENTS

| | | |
|---|---|---|
| 1,454,464 | Becket | May 8, 1923 |

FOREIGN PATENTS

| | | |
|---|---|---|
| 432,548 | Great Britain | July 22, 1935 |

OTHER REFERENCES

TID–7502 (Part I), pp. IV; 146–154, April 1955.
TID–7534 (Book 1), pp. 257–261, May 25, 1957.
The Book of Stainless Steels, edited by E. E. Thum, 2nd edition, pp. 304, 306–308, 315, 332, 343 (1935), American Society of Metals.